United States Patent

[11] 3,594,717

| [72] | Inventor | Albert Macovski<br>Palo Alto, Calif. |
| --- | --- | --- |
| [21] | Appl. No. | 864,351 |
| [22] | Filed | Oct. 7, 1969 |
| [45] | Patented | July 20, 1971 |
| [73] | Assignee | Stanford Research Institute<br>Menlo Park, Calif. |

[54] SONIC TRANSDUCER
6 Claims, 4 Drawing Figs.

[52] U.S. Cl............................................... 340/5 H,
73/67.5 H, 181/0.5 R
[51] Int. Cl....................................................... H04b 11/00,
G01n 29/04
[50] Field of Search.......................................... 340/5 H, 1,
3, 5, 5 T; 73/67.5 H, 67.5—67.9; 181/0.5

[56] References Cited
UNITED STATES PATENTS
3,434,339   3/1969   Stetson et al. .................   340/5 X

*Primary Examiner*—Richard A. Farley
*Attorney*—Urban H. Faubion

ABSTRACT: An object is acoustically illuminated and the acoustic image of the object is incident on and deforms an elastic surface. The elastic surface is illuminated with a first portion of light from a coherent source whereby the light is scattered to form an object beam. A second portion of the light from the coherent source is cyclically temporally offset by a modulator to form a modulated reference beam. The object and modulated reference beams are combined to form a light interference pattern which is optically scanned by an electron beam of an image dissector. The interference pattern and the electrical signal derived therefrom by the image dissector contain information relating to incidental variations in the elastic surface as well as the desired image vibrational signal. Electrical detectors and filters separate out the desired image vibrational signal which is applied to a cathode-ray tube for viewing. Alternatively, the cathode-ray tube display may be recorded on a photosensitive surface to create a holographic transparency which, when illuminated with coherent light, produces a hologram.

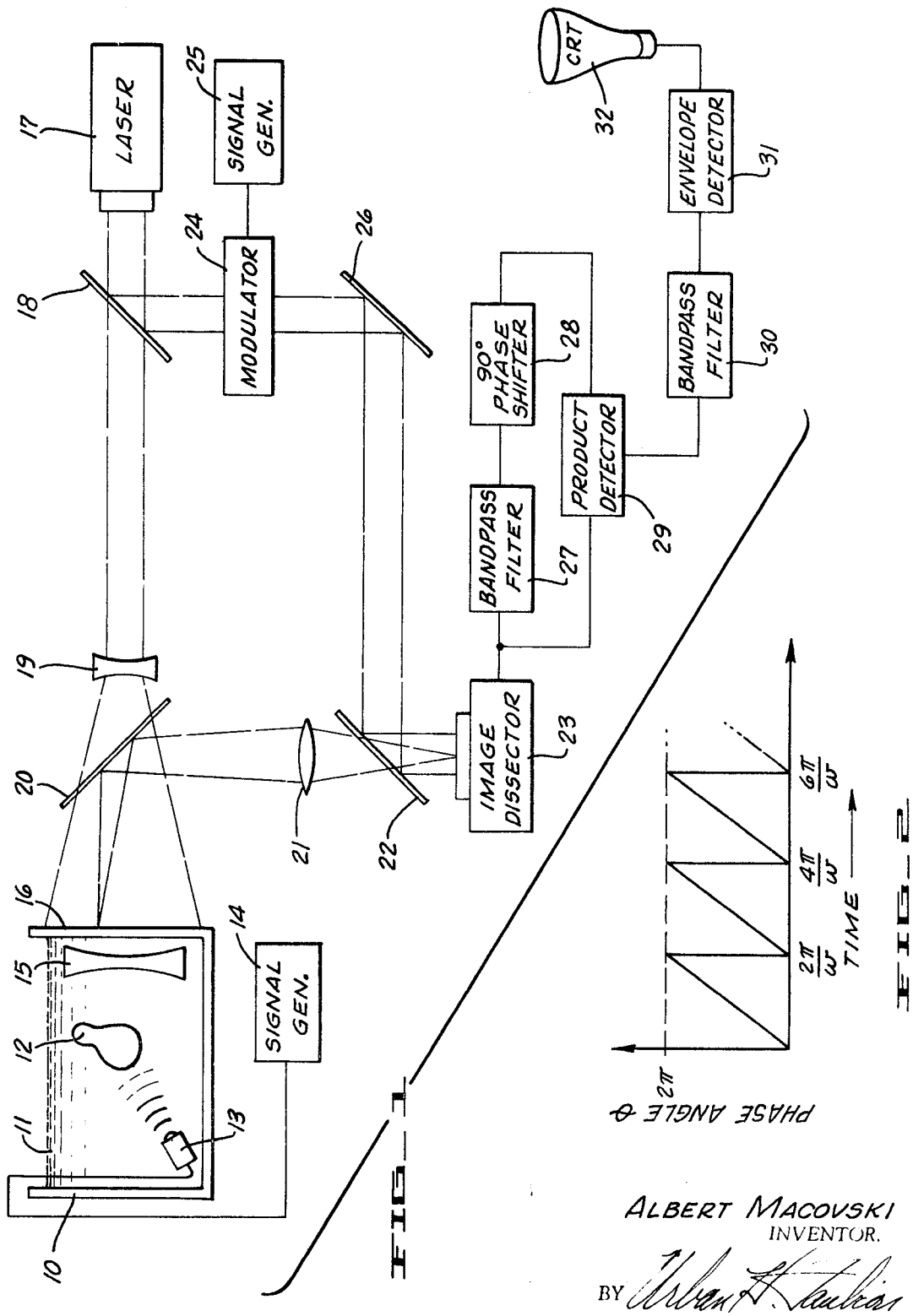

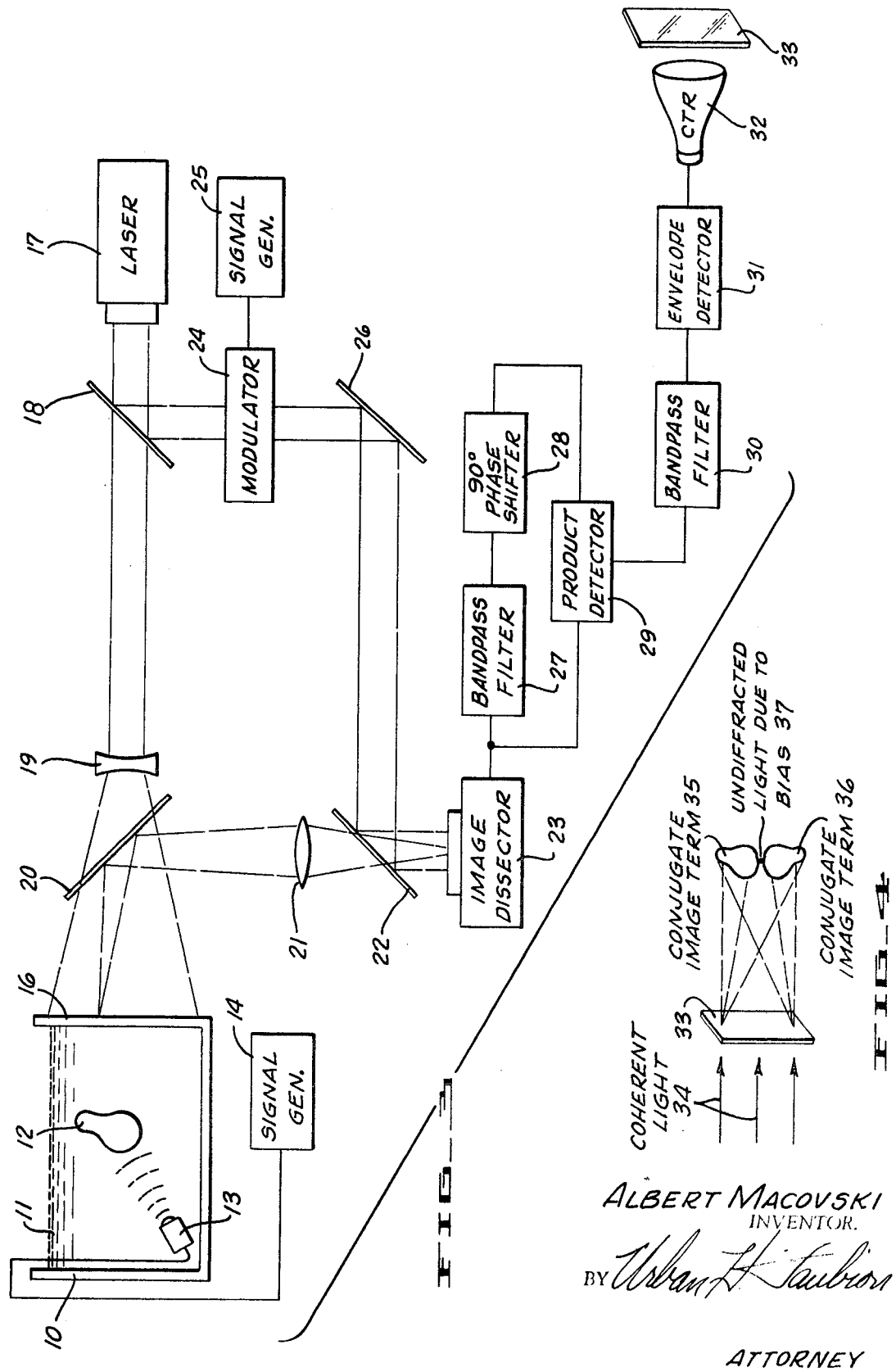

SONIC TRANSDUCER

BACKGROUND OF THE INVENTION

1. Field of the Invention

The present invention relates to a sonic transducer and more particularly to a transducer which provides in real time a visible image of an object being illuminated by sound energy.

2. Description of the Prior Art

Several devices and techniques have been developed for "seeing" with sound. Examples include sonar and other pulse echo techniques utilized in such fields as oceanography, structural engineering, and medicine. In addition, techniques have been developed to generate and record sound images rather than pulses and echoes; and, very recently, acoustical holography has been utilized as a means of recording sound images.

Acoustical holography is a process in which the acoustic diffractive pattern of an object is changed to a visual diffraction pattern, as for example by illuminating an elastic surface on which the acoustical diffraction pattern is incident. A coherent reference wave is also incident on the elastic surface and forms an interference pattern with the acoustical diffraction pattern thereon. The interference pattern is recorded and a visual reconstruction is created when the acoustical holograph is interrogated with a suitable coherent light source.

A sonic transducer or image converter is required in order to render visible the sound images, and the relative success of the various acoustical holography techniques depends in large measure on the properties of the particular acoustic image conversion techniques employed.

Several acoustical image converters have been developed in the past; however, the only notable real time image converter that has been very successful is the Sokolov tube. The Sokolov tube obtains information from a sonic field by scanning a thin piezoelectric slab with an electron beam, the slab being in contact with the fluid supporting the sonic field. The sonic field induces charges on the piezoelectric surface, which are read off by a scanning electron beam. The resulting electric signal is fed to a monitor, which then displays a picture of the incident sound field. In the Sokolov tube, however, the necessity of providing a vacuum on one side of the piezoelectric material and immersing the opposite side in a fluid presents immense mechanical difficulties when a large piezoelectric surface is considered because the piezoelectric material cannot be made arbitrarily thick to support the pressure differential. In fact, to obtain high sensitivity, a slab must be made one-half wavelength thick, a figure corresponding roughly to 0.005 to 0.015 inch thickness for common piezoelectric materials in the 3 to 10 MHz. frequency range.

SUMMARY OF THE INVENTION

Accordingly, it is an object of this invention to provide a real-time sonic energy converter.

It is a more specific object of this invention to provide an interference effect real-time sonic energy converter.

It is another object of this invention to derive sonic motions from a large area for use with real-time sonic imaging or holography systems.

It is a still more specific object of this invention to provide a real-time sonic transducer which uses optical interference techniques and a television camera as a pickup device.

Briefly, in accordance with one embodiment of the invention, an object is acoustically illuminated and the acoustic image of the object is incident on an elastic surface. The elastic surface is illuminated with a first portion of light from a coherent source whereby the light is scattered to form a object beam. Means are provided for modulating a second portion of light from the coherent source to form a modulated reference beam. The modulated reference beam and the object beam are combined to form a light interference pattern containing acoustical image information, which interference pattern also contains random vibrational information. Means are provided for scanning the light interference pattern and generating electrical waveforms having frequencies representing the image information and frequencies also representing random vibrational information. Electrical circuit means are provided for separating the image information and providing a visible display thereof.

BRIEF DESCRIPTION OF THE DRAWINGS

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings in which:

FIG. 1 is a schematic illustration of a real-time sonic energy transducer constructed in accordance with the principles of this invention and employing a television camera as a pickup device;

FIG. 2 illustrates a sawtooth waveform which represents the manner in which the reference wave is modulated to provide a temporal modulation; that is, time is plotted on the axis of abscissa, and the phase angle is plotted along the axis of ordinates, and the illustration shows that the phase is modulated $2\pi$ radians, then returned to its initial reference position cyclically;

FIG. 3 is a schematic illustration similar to FIG. 1 illustrating a sonic energy transducer constructed in accordance with the principles of this invention for recording an acoustical holograph; and FIG. 4 is a schematic illustration of a hologram reconstruction apparatus for reconstructing an image from a holographic recording produced by the apparatus of FIG. 3.

DESCRIPTION OF THE PREFERRED EMBODIMENTS

Optical interference techniques generally involve adding a coherent reference source to reflected light whereby the two light waves add or subtract depending on their relative path lengths from a common source. Since a difference of path lengths of $\pi$ radians or $0.3\mu$ will change an area from bright to dark, an arrangement of this type has an involved interference pattern solely due to incidental variations in the reflecting surface being evaluated. In sonic imaging, this reflecting surface is undergoing a slight motion which describes the sonic field. The resulting optical interference varies in intensity due to this motion. However, the incidental interference pattern will modulate these temporal intensity variations and thus seriously distort the results. This problem is overcome by a method and arrangement as shown in FIG. 1.

In FIG. 1, a container 10 is filled with a suitable liquid 11 (water, for example) in which an object 12 which is to be acoustically illuminated is disposed. A transducer 13 disposed within liquid 11 is driven by a signal generator 14 and illuminates the object 12 with sound waves. The acoustic image of the object 12 is imaged by an acoustic lens 55 on surface 56 of container 10. Surface 16 may be made of any suitable deformable, light-reflecting material. Silvered mylar, for example, has been found to be very satisfactory.

Coherent light from a continuous laser 17 is directed through a half-silvered mirror 18, a lens 59, and a half-silvered mirror 20 to the surface 16. This light is reflected from surface 16 in accordance with the acoustic image pattern thereon to form an object beam. The object beam is reflected by half-silvered mirror 20 to a lens 21 which images the reflected light through a half-silvered mirror 22 onto the face of an image dissector tube 23.

Part of the light from laser 17 is reflected by half-silvered mirror 18 and is offset in frequency an amount $\omega$ by a single sideband modulator 24. A signal generator 25 drives the single sideband modulator 24 which may satisfactorily be a sonic delay line modulator, an electro-optic phase modulator using a sawtooth input with $2\pi$ radians of phase modulation, or a pair of electro-optic modulators in phase quadrature with quadrature signals applied. In a preferred embodiment, the modulator 24 is an electro-optic phase modulator using a sawtooth input and is more fully discussed hereinafter with respect to FIG. 2. The light from modulator 24 is reflected by a mirror 26 and the half-silvered mirror 22 onto the face of the image dissector tube 23. The object light beam and the modulated reference light beam combine on the face of the image dissector tube 23 to form an interference pattern wherein the two light waves add or subtract depending on their relative path lengths from their common source, laser 17. A difference of path length of $\pi$ radians or $0.3\mu$, will change an area of the interference pattern from bright to dark. Thus, besides the interference pattern due to motion of the surface 16 which describes the sonic field, incidental variations in surface 16 also generate an interference pattern. Therefore, the interference pattern describing the sonic field must be separated from the incidental interference pattern.

The field amplitudes of the modulated reference beam of light and the object beam of light are $U_1$ and $U_2$, respectively, and are described by $$U_1 = e^{jkl_1(x,y)} e^{j\omega t}$$
$$U_2 = e^{jk[l_2(x,y) - 2\Delta(x,y,t)]}$$

Lengths $l_1$ and $l_2$ are the total path lengths of the reference and object beams from the laser 17 to the face of image dissector tube 23. They are both shown as functions of $x$ and $y$ so that no assumptions as to constant path length have been made. $\Delta(x,y,t)$ represents the desired vibrational signal representing the sonic field on surface 16.

The intensity of light on the face of image dissector tube 23 is the modulus squared of $U_1$ and $U_2$:

$$I = |U_1 + U_2|^2$$

substituting and expanding $$I = 2\left[1 + \cos k\left(2\Delta(t) + l_2 - l_1 - \frac{\omega t}{k}\right)\right]$$

ignoring for convenience, the constant 2

$$I = 1 + \cos(k2\Delta) \cos k\left(l_2 - l_1 - \frac{\omega t}{k}\right) - \sin(2k\Delta) \sin k\left(l_2 - l_1 - \frac{\omega t}{k}\right)$$

The sonic vibration encountered, $\Delta(t)$ will be of the order of Angstroms, in which case
$2k\Delta << 1$
$\cos 2k\Delta \cong 1$
$\sin 2k\Delta \cong 2k\Delta$
Therefore,
$I \cong 1 + \cos[k(l_2-l_1-\omega t)] - 2k\Delta(t) \sin[k(l_2-l_1)-\omega t]$ Referring again to FIG. 1, a band-pass filter 27, tuned to $\omega$ separates the $\cos[k(l_2-l_1)-\omega t]$ term in the above equation from the other terms. Since $\Delta(t)$ has no very low frequency components (in the vicinity of $\omega$), the last term in the above equation will not affect the output of the band-pass filter 27 tuned to $\omega$. The resultant signal from band-pass filter 27 is shifted by 90° by a phase shifter 28 to form $\sin[k(l_2-l_1)-\omega t]$ which is multiplied with the total signal from the above equation in a product detector 29. The resultant signal from the product detector is of the form
$\sin[k(l_2-l_1)-\omega t] + \sin[k(l_2-l_1)-\omega t] \cos[k(l_2-l_1)-\omega t]$
$-2k\Delta(S) \sin^2[k(l_2-l_1)-\omega t]$ which can be expressed as
$\sin[(k(l_2-l_1)-\omega t] + \sin[k(l_2-l_1)-\omega t]$
$-k\Delta(t)+k(\Delta t) \cos 2[k(l_2-l_1)-\omega t]$
This signal forms the input to a band-pass filter 30 which separates out the term $k\Delta(t)$. An envelope detector 31 is connected to band-pass filter 30 for detecting the envelope of $\Delta(t)$. The signal from envelope detector 31 is applied to a cathode-ray tube 32 for viewing. The display on cathode-ray tube 32 is a real-time display of the acoustic image of the object 12 without the presence of any of the undesired incidental vibrations of the surface 16.

The manner in which the modulator 24 cyclically temporally offsets the reference light beam from laser 17 may be more fully understood by reference to FIG. 2. The type of phase modulator or variable time delay device 24 used in the preferred embodiment is one of the class of electro-optic devices which consists of an electro-optic material having an index of refraction proportional to the voltage applied to the cell. Voltage is applied to the modulator 24 in the form of a sawtooth wave which returns from its maximum of $2\pi$ radians to zero every $2\pi/\omega$ seconds. This results in the phase shift illustrated in FIG. 2 where time is plotted along the axis of abscissa and phase shift along the axis of ordinates. The voltage increases linearly from zero at zero time to a maximum at $2\pi/\omega$ seconds and the index of refraction of the electro-optic material increases as the voltage increases, thus effectively slowing down the reference light beam as it passes through the electro-optic modulator 24 and shifting the phase linearly to $2\pi$ radians. At time $2\pi/\omega$ the applied voltage is abruptly reduced to zero, and the index of refraction of the electro-optic modulator 24 is reduced to a minimum and the phase shift returns to zero. Thus, the reference light wave is effectively slowed down and speeded up as it passes through the electro-optic cell 24, thus providing a phase modulation and a shifted frequency. For a more complete description of this action, see U.S. Pat. No. 3,353,896, Nov. 21, 1967, issued to D. J. Blattner, and entitled "Light Frequency Shifter."

Referring now to FIG. 3, there is shown a sonic transducer apparatus similar to that of FIG. 1, but adapted for creating acoustical holograms. Like reference numbers are used in FIG. 3 as in FIG. 1 to indicate corresponding elements which are the same. More specifically, container 10 is filled with a suitable liquid 11 in which an object for which a hologram is to be made is disposed. A transducer 13 disposed within liquid 11 is driven by a signal generator 14 and illuminates the object 12 with sound waves. Sinusoidal or temporally coherent sonic energy is used and, in contrast to the arrangement of FIG. 1, no imaging lenses are used within the volume of liquid 11. Rather, the diffracted and reflected sound waves produced by the object 12 are directly incident on an elastic surface 16.

Light from the continuous laser 17 is directed through half-silvered mirror 18, a lens 19, and a half-silvered mirror 20 to the surface 16. This light is reflected from surface 16 in accordance with the acoustic patten thereon to form an object beam. The object beam is directed by half-silvered mirror 20 through a lens 21 which images the reflected light through a half-silvered mirror 22 onto the face of the image dissector tube 23. Part of the light from laser 17 is reflected by half-silvered mirror 18 and is offset in frequency an amount $\omega$ by a single sideband modulator 24 driven by a signal generator 25. The modulated light beam of modulator 24 forms a reference light beam that is reflected by mirror 26 and half-silvered mirror 22 onto the face of image dissector tube 23. The electrical circuitry comprising band-pass filter 27, 90° phase shifter 28, product detector 29, band-pass filter 30, and envelope detector 31 operate in the same manner as discussed with respect to FIG. 1 to separate out the desired vibrational signal representing the acoustical information on surface 16 and present this signal to a cathode-ray tube 32. A photosensitive surface or film 33 is used to record the holographic information on the face of the cathode-ray tube 32; that is, the film 33 becomes a holographic recording.

Now referring to FIG. 4, there is shown a conventional holographic reconstruction apparatus for reconstructing a visual, three-dimensional image from the holographic recording 33. The holographic recording 33 is subjected to light 34 from a source of coherent illumination (not shown). It is not essential that the light 34 be the same as the original object illumination. Types of illumination which may be utilized for image reconstruction are treated elsewhere and are not considered part of the present invention. Light passing through the holographic recording 33 is diffracted by the recorded pattern to reconstruct conjugate images 35 and 36. The center of the reconstruction contains a point image 37 which represents undiffracted light due to bias.

While particular embodiments of the invention have been shown and described, it will of course be understood that the invention is not limited thereto since many modifications in the circuits optical arrangements, and in the instrumentalities employed may be made. It is contemplated that the appended claims will cover any such modifications as fall within the true spirit and scope of the invention.

What I claim is:
1. An interference effect sonic image converter comprising:
   a. Means for acoustically illuminating an object;
   b. An elastic surface on which an acoustic image of the object is incident;
   c. A coherent light source;
   d. Means for illuminating said elastic surface with a first portion of light from said coherent light source whereby the light is scattered by the acoustic image to form an object beam;
   e. Modulating means for modulating a second portion of light from said coherent light source to form a reference beam;
   f. Means for combining said object beam with said reference beam to form a light interference pattern containing acoustic image information and incidental information;
   g. Scanning means for scanning said light interference pattern and generating electrical waveforms with first frequencies representing said acoustic image information and second frequencies representing said incidental information;
   h. Separation means for separating said first frequencies representing acoustic information; and
   i. Display means responsive to said first frequencies representing acoustic image information for generating a visible display of said image information.

2. A sonic image converted as defined in claim 1 in which said scanning means comprises an image dissector.

3. A sonic image converter as defined in claim 1 in which said separation means comprises:
   a. A first band-pass filter having an input and an output, said input connected to said scanning means whereby a portion of said first and said frequencies is passed;
   b. A 90° phase shifter having an input and an output, said input connected to said output of said first band-pass filter whereby said portion of said first and second frequencies is shifted in phase to form a shifted portion;
   c. A product detector having first and second inputs and an output, said first input connected to said scanning means and said second input connected to said output of said 90° phase shifter whereby said first and second frequencies are multiplied by said shifted portion to form a product at said output of said product detector;
   d. A second band-pass filter having an input and an output, said input connected to said output of said product detector and said output connected to said display means, whereby said first frequencies are separated from said product and applied to said display means.

4. A sonic image converter as defined in claim 1 additionally including an acoustic lens for imaging an acoustical image of the object on said elastic surface and wherein said display means comprises an envelope detector and a cathode-ray tube for displaying said first frequencies representing acoustic image information.

5. A sonic image converter as defined in claim 1 wherein said display means comprises:
   a. An envelope detector for detecting the envelope of said first frequencies representing acoustic image information;
   b. A cathode-ray tube for displaying said envelope;
   c. A photosensitive material for recording said envelope as it appears on the cathode-ray tube; and
   d. Means for illuminating said photosensitive material with coherent light whereby a holographic image of said acoustic image information is reconstructed.

6. A sonic image converter as defined in claim 1 wherein said modulating means comprises an electro-optic phase modulator having a sawtooth input with $2\pi$ radians of phase modulation.